United States Patent [19]

Nishikawa

[11] Patent Number: 4,741,157
[45] Date of Patent: May 3, 1988

[54] WAVE-ACTIVATED POWER GENERATING APPARATUS HAVING A BACKWARDLY OPEN DUCT

[76] Inventor: Koichi Nishikawa, 58, Komatsu-cho, Toyohashi-shi, Aichi-ken, Japan

[21] Appl. No.: 33,978

[22] Filed: Apr. 1, 1987

[30] Foreign Application Priority Data

Apr. 1, 1986 [JP] Japan .................................. 61-72428

[51] Int. Cl.⁴ .............................................. F03B 13/12
[52] U.S. Cl. ........................................ 60/398; 60/502; 290/53
[58] Field of Search ................. 60/398, 497, 501, 502; 417/330, 331; 290/42, 53

[56] References Cited

U.S. PATENT DOCUMENTS

| | | | |
|---|---|---|---|
| 4,078,382 | 3/1978 | Ricafranca et al. | 290/53 X |
| 4,086,775 | 5/1978 | Peterson, Jr. | 60/398 X |
| 4,405,866 | 9/1983 | Masuda et al. | 60/502 X |

*Primary Examiner*—Stephen F. Husar
*Attorney, Agent, or Firm*—Alan H. MacPherson; Thomas S. MacDonald; Richard Franklin

[57] ABSTRACT

A wave-activated power generating apparatus includes a generally L-shaped duct including a vertically extending portion and a horizontally extending portion and a floatable main body fixedly attached to the duct. The floatable main body is provided such that it is located rearwardly of the vertically extending portion of the duct when the apparatus is set in position floating on the water surface. The horizontally extending portion is in fluidic communication with the vertically extending portion and has an open rear end which is submerged underwater in normal operating condition. Because of the particular arrangement of the main body with respect to the vertically extending portion of the duct, the apparatus is subjected to pitching motion vigorously, which allows to obtain an increased power output. In addition, the water column is ejected in the form of a jet stream in the rearward direction, which contributes to mitigate the mooring force requirements.

14 Claims, 7 Drawing Sheets

WAVE-ACTIVATED POWER GENERATING APPARATUS HAVING A BACKWARDLY OPEN DUCT

BACKGROUND OF THE INVENTION

1. Field of the Invention

This invention generally relates to an apparatus for converting wave energy into electrical energy, and, more in particular, to a power generating apparatus for generating electrical power utilizing wave motion. More specifically, the present invention relates to a wave-activated power generating apparatus having a backwardly open duct which is open backwardly with respect to the advancing direction of waves relative to the apparatus.

2. Description of the Prior Art

A wave-activated power generating apparatus is currently used in the form of a buoy as a nautical mark. One example of such a wave-activated power generating buoy is schematically shown in FIG. 1. As shown, the wave-activated power generating buoy 1 includes a pipe 3 which is immersed vertically downward with respect to the water surface. The pipe 3 has a bottom end 4 opened downwardly and there is formed an air chamber 2 together with the water surface in the vicinity of a top end of the pipe. Above the air chamber 2 is provided a valve chamber 5, whose interior is divided into an upper chamber 5a and a lower chamber 5b. An air turbine 6 and a power generator 7 driven by the air turbine 6 are provided inside of the upper chamber 5a. On the other hand, in the side walls of the upper chamber 5a and the lower chamber 5b of the valve chamber 5 are provided an appropriate number of valves 8 capable of being opened and closed. The upper chamber 5a is in fluidic communication with the lower chamber 5b via a through-hole 5c. Thus, as the water surface inside of the pipe 3 moves up and down due to wave motion, the air inside of the air chamber 2 flows into the atmosphere through the lower chamber 5b and the upper chamber 5a as indicated by the arrow in FIG. 1, whereby this air flow is utilized to rotate the air turbine 6 thereby driving the generator 7 to generate power.

In the structure shown in FIG. 1, the pipe 3 typically has a length of approximately 4 meters and provides the maximum specific pressure (pressure head inside of the air chamber 2/wave height) of approximately 0.3 at the throttling ratio (nozzle cross sectional area/cross sectional area of the air chamber 2)=1/100.

Another example of a wave-activated power generating apparatus is schematically shown in FIG. 2. This example is constructed in the form of a ship-shaped buoy as a large-scale implementation. The ship-shaped buoy 9 is provided with a front opening 9a at the bow thereof and a side opening 9b at each side thereof. Although not shown, the ship-shaped buoy 9 is also provided with a duct which is in fluidic communication with all of these front and side openings and also with an air chamber, which is associated with an air turbine. In this case, the front or bow of the ship-shaped buoy 9 is connected to mooring means so that the front opening 9a and also side openings 9b are directed generally opposite to the advancing direction of waves. With such a structure, the specific pressures in the order of 0.3 (at the front opening 9a) and 0.15 (at the side opening 9b) are obtained at the throttling ratio of 1/100. It is to be noted, however, that the mooring force is extremely high because the front opening 9a is directed opposite to the advancing direction of travelling waves.

The power generating buoy shown in FIG. 1 has the pipe 3 which extends downwardly and thus it cannot be used in shallow waters. On the other hand, the power generating apparatus shown in FIG. 2 requires high mooring force and thus it has problems under harsh weather conditions, such as stormy weather, though it may be used in shallow waters. Under the circumstances, there has been proposed a wave-activated power generating apparatus 10 having a backwardly open duct as shown in FIG. 3. As shown, the apparatus 10 of FIG. 3 includes a floatable buoy main body 11 and a front float 12. The apparatus 10 also includes an L-shaped duct 14 having a horizontally extending portion 14a and a vertically extending portion 14b. The horizontally extending portion 14a has one end connected in fluidic communication to the bottom end of the vertically extending portion 14b and the other end open backwardly and thus directed in the same direction as the advancing direction of waves with respect to the apparatus 10. An air chamber 15 is defined at the top end of the vertically extending portion 14b so that the air inside of the air chamber 15 is periodically compressed due to the relative motion between the column of water inside of the duct 14 and the duct 14. A nozzle opening 16 is defined at the top of the air chamber 15 so that the compressed air is discharged out of this nozzle opening 16, thereby driving to rotate an air compressor (not shown). The vertically extending portion 14b is located between the buoy main body 11 and the front float 12. The structure shown in FIG. 3 may be used in shallow waters and the mooring force can be avoided to become excessive because the opening 14c is directed backwardly with respect to the advancing direction of waves. A more detailed description of the type of the apparatus 10 shown in FIG. 3 may be found in U.S. Ser. No. 619,632, pending, filed June 14, 1984, entitled "WAVE-ACTIVATED POWER GENERATOR", partially assigned to the applicant of this application.

SUMMARY OF THE INVENTION

The present invention is an improvement over the wave-activated power generator disclosed in the above-identified U.S. patent application Ser. No. 619,632, and it has a floatable buoy main body elongated in shape and a generally L-shaped duct including a vertically extending portion, which is located forwardly of the buoy main body and preferably attached to a front end of the buoy main body, and a horizontally extending portion having a rear opening which is submerged in the water and generally directed in the direction of advancing waves. An air chamber is defined at the top end of the vertically extending portion, and the air inside of the air chamber is periodically compressed, whereby the compressed air is discharged out of the air chamber to drive an air turbine operatively coupled to a power generator. The L-shaped duct preferably includes a curved portion interposed between the horizontally and vertically extending portions, thereby allowing the column of water inside of the duct to move smoothly relative to the duct with a minimum of energy loss. The apparatus also includes mooring means having one end connected to the duct, preferably to the curved portion of the duct, such that the apparatus as a whole is subjected to pitching motion. Such a pitching motion allows to obtain an increased relative motion between the water column inside of the duct and the duct.

Since the vertically extending portion of the duct is located forwardly of the buoy main body and preferably attached to the front end of the buoy main body thus having no front float, an increased pitching motion can be obtained in the present apparatus. Preferably, the longitudinal length of the apparatus, or more specifically of the horizontally extending portion of the L-shaped duct has a dimension in a range of 0.2 to 0.6, most preferably approximately 0.4, of the wave length of travelling waves at the water surface. It has been found that, when the horizontally extending portion of the L-shaped duct has a longitudinal length in this range, there is obtained an increased pitching motion, thereby allowing to obtain an increased relative motion between the water column and the L-shaped duct. In addition, it is preferable to make the horizontally extending portion of the L-shaped duct such that it extends straight horizontally and includes a bottom wall which is curved in cross section.

It is therefore a primary object of the present invention to obviate the disadvantages of the prior art as described above and to provide an improved apparatus for converting wave energy into electrical energy.

Another object of the present invention is to provide an improved wave-activated power generating apparatus which can be used in shallow waters and also under harsh weather conditions without problems.

A further object of the present invention is to provide an improved wave-activated power generating apparatus easy and inexpensive to manufacture and yet high in performance.

A still further object of the present invention is to provide an improved wave-activated power generating apparatus suitable for use as a nautical mark or a buoy.

Other objects, advantages and novel features of the present invention will become apparent from the following detailed description of the invention when considered in conjunction with the accompanying drawings.

DESCRIPTION OF THE PREFERRED EMBODIMENTS

Figure 1:
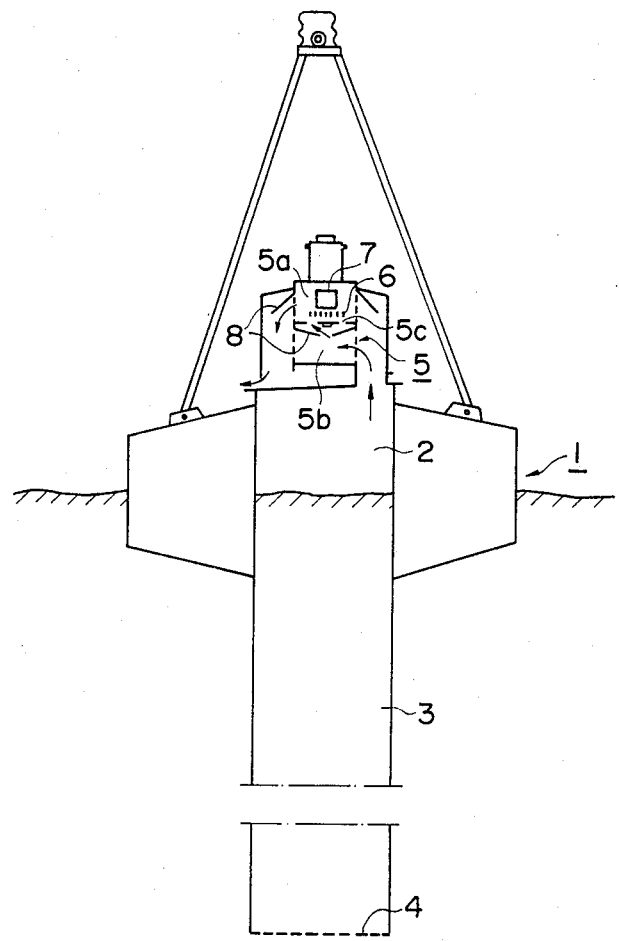
FIG. 1 is a schematic illustration showing an example of a prior art wave-activated power generating buoy having a long downwardly extending pipe.
Figure 2:
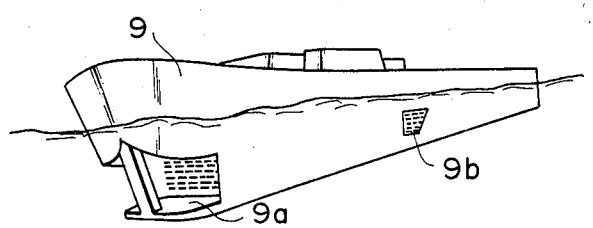
FIG. 2 is a schematic illustration showing another example of a prior art wave-activated power generating apparatus constructed in the form of a ship-shaped buoy having a forwardly open working duct.
Figure 3:
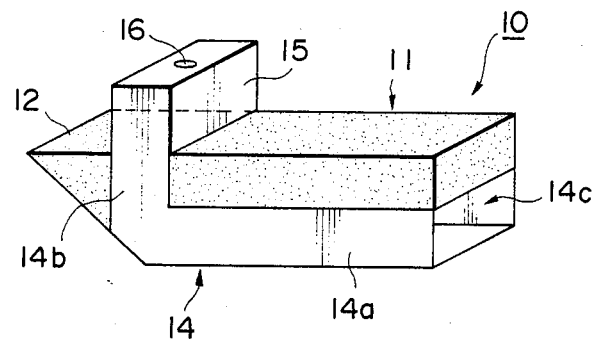
FIG. 3 is a schematic illustration showing a further example of a prior art wave-activated power generating apparatus having a backwardly open working duct.
Figure 4:
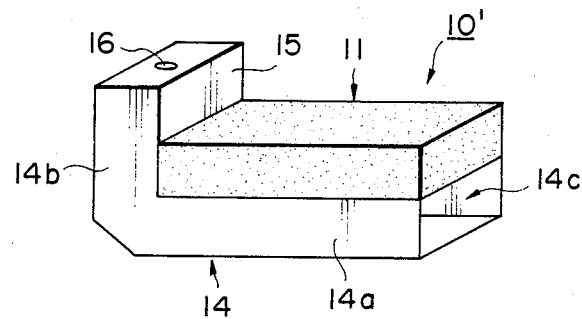
FIG. 4 is a schematic illustration showing an improved wave-activated power generating apparatus having a backwardly open working duct which is an improvement over the structure illustrated in FIG. 3, which forms the basis of the present invention.

Referring now to FIG. 4, there is schematically shown a wave-activated power generating apparatus 10' which forms the basic structure of the present invention. The apparatus 10' shown in FIG. 4 is similar in many respects to the apparatus shown in FIG. 3. That is, the apparatus 10' includes a floatable buoy main body 11 generally rectangular in shape and a generally L-shaped duct 14 fixedly attached to the front and bottom sides of the main body 11. The L-shaped duct 14 has a generally rectangular cross section and includes a horizontally extending portion 14a extending horizontally straight and a vertically extending portion 14b extending vertically straight. The horizontally extending portion 14a has its front end connected in fluidic communication with the bottom end of the vertically extending portion 14b and its rear end opened in the backward direction. An air chamber 15 is defined at the top portion of the vertically extending portion 14b and a nozzle opening 16 is formed at the top end of the vertically extending portion 14b. Although not shown, it is to be noted that a suitable mooring means, such as chain, rope or cable, is connected to the front end of the apparatus 10' so that the apparatus 10' is directed with its rear opening 14c directed backwardly when the apparatus 10' is placed on the water surface.

When the apparatus 10' is placed on the water surface, since its front end is connected to mooring means, the apparatus 10' is oriented with the horizontally extending portion 14a extending along the advancing direction of travelling waves so that the rear opening 14c submerged in the water is directed in the backward direction with respect to the advancing direction of travelling waves. It is to be noted that the floatable main body 11 is provided rearwardly of the vertically extending portion 14b and no floatable member is provided in front of the vertically extending portion 14b in the structure shown in FIG. 4. With this structure, when a travelling wave moves past the present apparatus 10', the apparatus 10' is subjected to pitching motion. Accordingly, at the first phase of the pitching motion, the water column present in the horizontally extending portion 14a tends to move out of the horizontally extending portion 14a through the rear opening 14c because the front end of the apparatus 10' tends to move upward as lifted by the travelling wave. As the travelling wave further moves, thereby entering into the second phase of the pitching motion, the rear end of the apparatus 10' tends to move upward at a higher level than the front end, so that the water tends to move into the horizontally extending portion 14a. In this manner, there is obtained an increased relative motion between the water column inside of the duct 14 and the duct 14. It should be so designed that the rear opening 14c remains submerged even if the apparatus 10' is subjected to such a pitching motion.

In the preferred embodiment, the horizontally extending portion 14a has a longitudinal length which is in a range between approximately 0.2 and 0.6, most preferably approximately 0.4, times the wave length of predominant travelling waves. As will be described more in detail later with reference to FIG. 8, it has been found that an increased pitching motion can be obtained by setting the length of the horizontally extending portion 14a in the above-described range. It should also be noted that, although not shown specifically, an air turbine is provided in association with the air flow flowing out of the nozzle opening 16 such that the air turbine can be driven to rotate by this air flow, and a power generator should also be provided to be operatively coupled to the air turbine.

Figure 6:
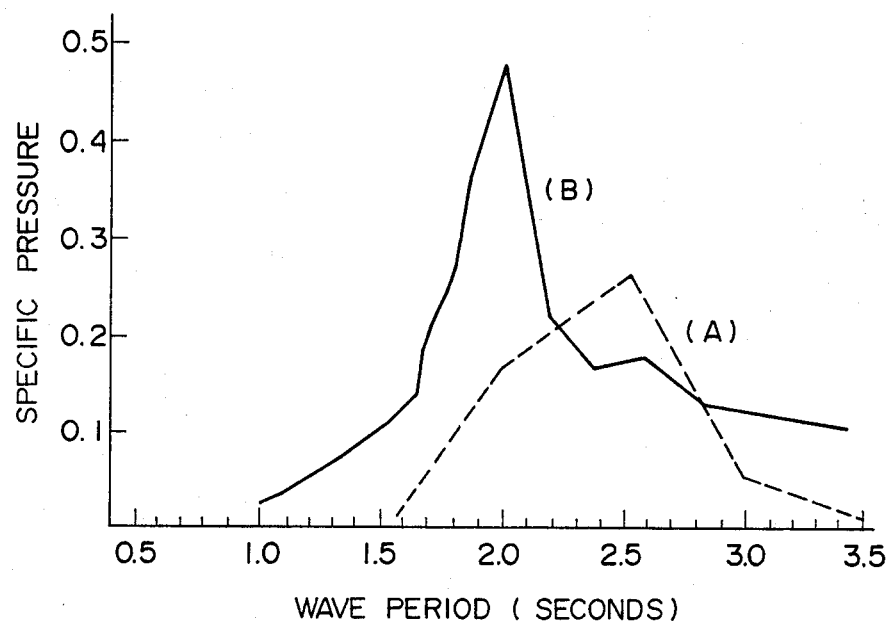
FIGS. 6 through 10 are graphs which are useful for explaining the advantages of the present invention.

Experiments have been conducted for the two models shown in FIGS. 3 and 4 for comparison, and the results are graphically shown in FIG. 6. As described previously, the two models are basically the same in structure excepting the fact that the front float 12 is not provided for the model 10' shown in FIG. 4. In both models, the longitudinal length was approximately 2.3 meters and the width was approximately 0.92 meters. The experimental results are plotted in the graph of FIG. 6 whose ordinate is taken for specific pressure, which is a ratio of the pressure head within the air chamber to the wave height, and abscissa is taken for wave period in terms of seconds. The nozzle throttling ratio, which is a ratio between the cross sectional area of the nozzle opening 16 and the cross sectional area of the air chamber 15, was set at 1/100 for both cases. The dotted line with the designation of A shows the results obtained for the apparatus shown in FIG. 3 and the solid line with the designation of B shows the results obtained for the apparatus shown in FIG. 4.

As shown in FIG. 6, in the case of the apparatus 10' having no front float shown in FIG. 4, the specific pressure reaches as high as 0.47; whereas, the peak specific pressure for the case of the apparatus 10 having the front float 12 shown in FIG. 3 is only 0.27. Since the ratio of air output in a wave-activated power generator is calculated the as 1.5 power of the specific pressure, the ratio of air output in this case can be calculated as $(0.47/0.27)^{1.5} = 2.3$. Besides, it should also be noted that the usable range of wave period is much wider for the apparatus 10' shown in FIG. 4 as compared with the apparatus 10 shown in FIG. 3. This indicates the fact that the apparatus 10' having no front float can produce a required air flow practically usable for generation of electricity with waves having various periods. Accordingly, the apparatus 10' shown in FIG. 4 can be used to produce under various weather conditions, such as calm and strong wind conditions, without loss of efficiency. This is not the case for the apparatus 10 having the front float 12 shown in FIG. 3 because the range of wave lengths of waves usable for generation of electricity is rather limited. Thus, the apparatus 10 can be used only when the waves have undulating periods in a predetermined range.

The reason why there is such a large difference in performance between the apparatus 10 with the front float 12 and the apparatus 10' without front float is believed to be attributable to the fact that an object floating on the water surface is typically subjected to four separate motions, including pitching, yawing, rolling and heaving or vertically translational motions. In the case of a floatable wave-activated power generator having a backwardly open duct as in the case of the apparatus 10 shown in FIG. 3 and also in the case of the apparatus 10' shown in FIG. 4, the pitching motion is believed to be the most important factor in obtaining an increased efficiency in conversion of wave energy into electrical energy. Because when the apparatus having a backwardly open duct, which includes a horizontally extending portion and a vertically extending portion, is subjected to pitching motion, there is obtained an increased relative motion between the water column in the horizontally extending portion and the horizontally extending portion of the duct.

Described more in detail in this respect, in the first half period of pitching motion after the peak of the travelling wave has arrived at the front end of the apparatus, the front end of the apparatus tends to move upward with respect to the rear end of the apparatus, so that the water column resident inside of the duct tends to move out of the duct into the open water. On the other hand, in the second half of the pitching motion after the peak of the travelling wave has reached the center of the apparatus, the front end of the apparatus moves downward with respect to the rear end of the apparatus, so that the water tends to move into the duct from the open water. In this manner, the pitching motion helps to obtain an increased relative motion between the water column inside of the duct and the duct. If the front float 12 is provided in front of the vertically extending portion 14b in addition to the main float 11 as shown in FIG. 3, the pitching motion tends to be suppressed, thereby hindering to obtain an increased relative motion between the water column and the horizontally extending portion 14a. On the other hand, if no front float is present as shown in FIG. 4, the apparatus 10' is vigorously subjected to pitching motion, so that an increased relative motion between the water column and the horizontally extending portion 14a can be obtained. It is true that an apparatus having only a front float and no backward or main float can theoretically also provide an increased relative motion between the water column and the horizontally extending portion 14a however, such an apparatus is believed to be unstable in operation and lower in structural integrity. Thus, the present applicant has determined that the provision of only the floatable main body 11 rearwardly of the vertically extending portion 14b is preferred in obtaining an increased relative motion between the water column and the duct and thus an increased efficiency in conversion from wave energy into electrical energy.

In the structure shown in FIG. 4, the floatable main body 11 extends rearwardly the length of the horizontally extending portion 14a of the duct 14. Although the floatable main body 11 can be made shorter or longer, or, for that matter, wider or narrower than the horizontally extending portion 14a. The structure shown in FIG. 4 is most preferable because it can provide the highest structural integrity and smoothest operation. That is, it is most preferable to maintain the horizontally extending portion 14a in parallel with the horizontal plane because this then allows to use the apparatus in any shallow waters. If the horizontally extending portion 14a is maintained inclined when placed on the water surface, this prohibits the usage of the apparatus in some shallow waters. However, in the apparatus 10' shown in FIG. 4, the duct 14 has a rectangular cross section and there are present sharp corners and edges in the channel defined by the duct 14, though there is provided a slanted front bottom end. Thus, there is a possibility that eddies are produced as the water column moves inside of the duct 14 as the travelling waves move past the apparatus 10'. In addition, the drag force applied to the apparatus 10' is relatively large because of the flatness of its front end surface, which requires a large mooring force to keep the apparatus 10' in position.

Figure 5:
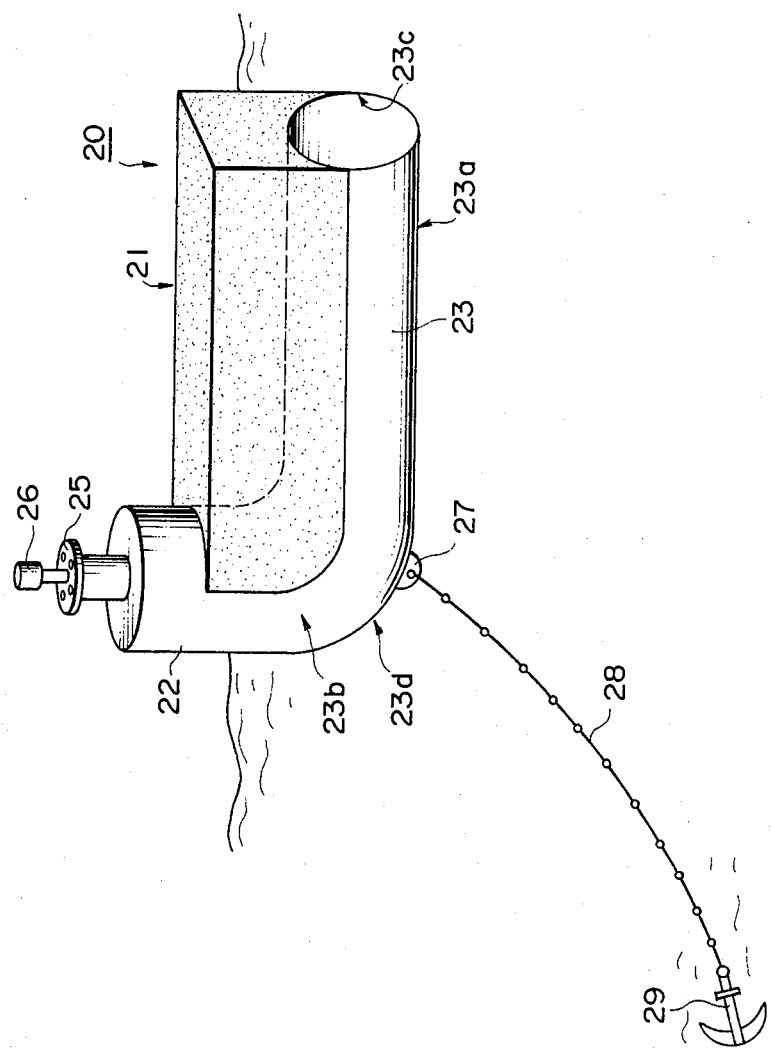
FIG. 5 is a schematic illustration showing a wave-activated power generating apparatus constructed in accordance with one embodiment of the present invention.

Referring now to FIG. 5, there is schematically shown a wave-activated power generating apparatus 20 which is constructed in the form of a buoy in accordance with one embodiment of the present invention and which is an improvement over the apparatus 10' shown in FIG. 4. As shown, the apparatus 20 includes a floatable main body 21 which is generally elongated in shape and comprised of a floatable material or a chamber containing therein a gas, such as air, to produce a buoyancy force. In the illustrated embodiment, the main body 21 has a flat top surface, a pair of flat and parallel side surfaces, a flat rear end surface, an inwardly curved front end surface and an inwardly curved bottom surface. The main body 21 may have any other desired shape, but the particular shape illustrated in FIG. 5 is preferred because it can provide a high structural integrity, with ease in manufacture. As will be made clear later, the main body 21 has a predetermined length in its longitudinal direction in order to obtain an increased efficiency and stability.

The apparatus 20 also includes a generally L-shaped duct 23 which is fixedly attached to the main body 21. In the illustrated embodiment, since the duct 23 is made of a hollow cylindrical pipe, it is partly received in the inwardly curved front and bottom surfaces of the main body 21, which is advantageous because it provides an increased structural integrity between the main body 21 and the duct 23, though such a combination is not necessary at all times even if it is preferable. The duct 23 includes a horizontally extending portion 23a, a vertically extending portion 23b and a curved connecting portion 23d connecting the front end of the horizontally extending portion 23a in fluidic communication to the bottom end of the vertically extending portion 23b. The provision of such a curved connection portion 23d helps to obtain a smooth transitional movement of the water column between the horizontally and vertically extending portions 23a and 23b with a minimum of energy loss, which thus contributes to obtain an increased relative motion between the water column and the duct 23. Moreover, since the duct 23 itself is formed by a hollow cylindrical pipe, there are virtually no sharp corners and edges in the channel defined by the duct 23 so that the possibility of formation of eddies due to the reciprocating motion of the water column inside of the duct 23 is also minimized.

The horizontally extending portion 23 has a rear open end 23c which is open to the water and oriented in the backward direction with respect to the advancing direction of travelling waves moving past the apparatus 20. In the illustrated embodiment, the horizontally extending portion 23a is as long as the main body 21. Although this is not an absolute requirement, such a structure is preferable in certain respects, such as structural integrity. It should be noted, however, that the relative size of the horizontally extending portion 23a and the main body 21 can be determined appropriately taking into various conditions in specific applications. For example, the relative length may be determined so as to keep the horizontally extending portion 23 in parallel with the horizontal plane, thereby allowing to use the apparatus 20 in any shallow waters. It should also be noted that the bottom and front end surfaces of the apparatus 20 are rounded because these surfaces are defined by the side wall of the L-shaped pipe duct 23. The provision of such a rounded front end surface, together with the curved connecting portion 23d, allows to reduce the pressure drag force encountered by the apparatus 21, and, thus, it contributes to reduce the level of mooring force required to keep the apparatus 20 in position. In addition, as will be described more in detail later as a comparison between the apparatus 10' shown in FIG. 4 and the apparatus 20 shown in FIG. 5, the rounded bottom surface presented by the horizontally extending pipe portion 23a contributes to obtain an increased specific pressure, which, in turn, allows to obtain an increased energy conversion efficiency.

As described previously, the horizontally extending portion 23a preferably has a length in its longitudinal direction, which is in a range between approximately 0.2 and 0.6, most preferably approximately 0.4 times, the wave length of predominant travelling waves. As will be described more in detail later in relation to FIG. 8, it has been found that the longitudinal length of the apparatus 20 or more precisely the horizontally extending portion 23a of the duct 23 is preferably set such that the ratio of the longitudinal length to the wave length of travelling waves is in a range between approximately 0.2 and 0.6, preferably approximately at 0.4. With the longitudinal length of the apparatus 20 or horizontally extending portion 23a set in this range, there is obtained an increased pitching motion and thus an increased relative motion between the water column and the duct 23.

The apparatus 20 further includes a mooring means which includes a chain 28 and an anchor 29 to which one end of the chain 28 is connected. The apparatus 20 also includes a tab 27 fixedly attached to or integrally formed with the curved connecting portion 23d of the duct 23, and the other end of the chain 28 is connected to the tab 27. It is to be noted that the mounting position of the tab 27 is so determined that it does not obstruct the pitching motion of the apparatus 20, so that the tab 27 is preferably located at a hypothetical fulcrum of the pitching motion of the apparatus 20.

An air chamber 22 is defined at the top portion of the vertically extending portion 23b of the duct 23, and the air chamber 22 is, in fact, defined by the circumferential side wall and the top end wall of the vertically extending portion 23b and the water surface of the water column inside of the duct 23. As a result, the air inside of the air chamber 22 is subjected to periodic compression as the water column moves back and forth inside of the duct 23. Although not shown, a nozzle opening or hole is formed at the top end wall of the vertically extending portion 23b, so that the air flows into and out of the air chamber through the nozzle opening alternately in association with the back and forth movement of the water column inside of the duct 23. This air flow is applied to an air turbine 25 rotatably mounted on top of the vertically extending portion 23b in the illustrated embodiment, so that the air turbine 25 is driven to rotate an electric power generator 26 which is also mounted on top of the vertically extending portion 23b in operative association with the air turbine 25. Use may be made of an air turbine which can rotate only in a predetermined direction utilizing the air flow changing its direction alternately as the air turbine 25. Alternatively, provision is made of one or more valves attached to the side wall of the air chamber 22 (not shown) such that the air only flows into the air chamber 22 through these valves when the water column moves out of the duct 23 and no air flows out of the air chamber through these valves when the water column compresses the air inside of the air chamber 22. With such a structure, there is always obtained an outgoing air flow through the nozzle opening, and the air flow applied to the air turbine 25 is directed only in one way.

Figure 7:
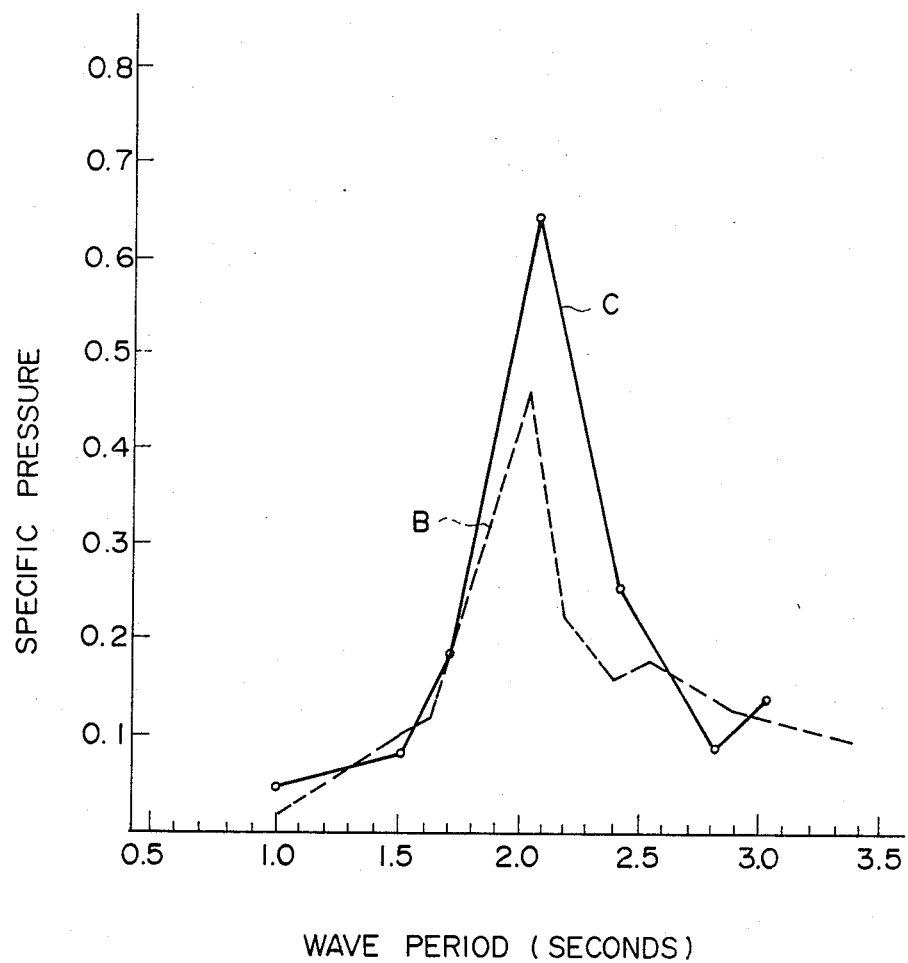

Referring now to FIG. 7, there are graphically shown the experimental results obtained for the apparatus 20, having the longitudinal length of 2.4 meters and the width of 0.6 meters, shown in FIG. 5 and the apparatus 10' shown in FIG. 4. The graph of FIG. 7 has an abscissa taken for the wave period in terms of seconds and an ordinate taken for the specific pressure. The results obtained for the apparatus 10' shown in FIG. 4 are indicated by the dotted line designated by B and the results obtained for the apparatus 20 shown in FIG. 5 are indicated by the solid line designated by C. Both of the apparatuses 10' and 20 had the nozzle throttling ratio of 1/100. The major structural difference between the apparatus 10' shown in FIG. 4 and the apparatus 20 shown in FIG. 5 resides in the shape of the duct used. That is, the apparatus 10' of FIG. 4 has the duct 14 which is rectangular in cross section and thus provides a flat bottom surface; on the other hand, the apparatus 20 of FIG. 5 has the duct 23 which is circular in cross section and thus provides a rounded bottom surface. The peak specific pressure obtained for the flat bottomed apparatus 10' of FIG. 4 is 0.47 and that of the round bottomed apparatus 20 of FIG. 5 is 0.65. As a result, the air output ratio between these two apparatuses 10' and 20 can be calculated as $(0.65/0.47)^{1.5} = 1.6$. This thus indicates that an increased output can be obtained by using a rounded bottom.

Figure 8:
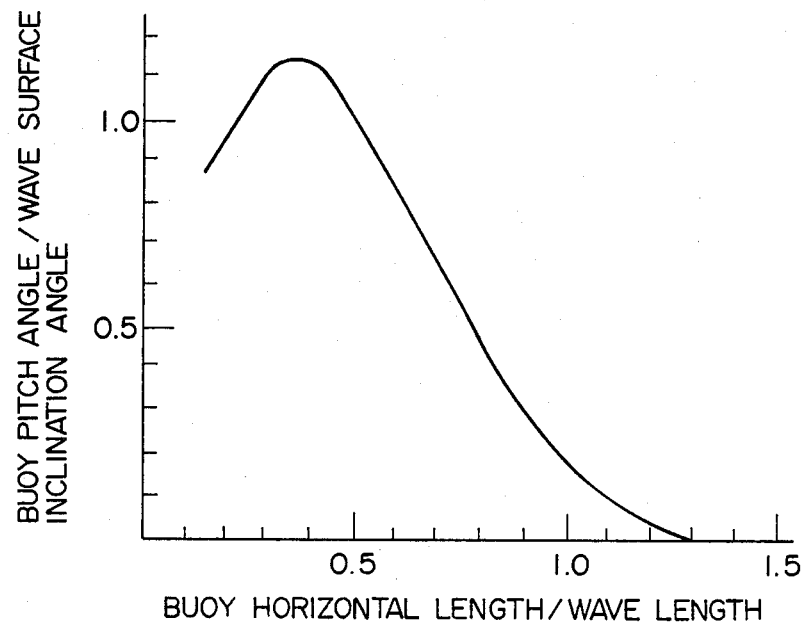

Reference will now be made to FIG. 8, which shows the experimental results obtained for the level of pitching motion incurred to a moored floating object, such as the apparatus shown in FIGS. 4 or 5, by travelling waves. The results plotted in the graph of FIG. 8 clearly indicate the fact that the pitching motion is almost nonexistent if the longitudinal length of the floating object or apparatus is approximately equal to 1.3 times the wave length of the travelling waves moving past the floating apparatus. On the other hand, as the longitudinal length of the floating apparatus becomes shorter, the pitching motion incurred to the floating apparatus gradually increases. And, when the longitudinal length becomes approximately equal to 0.5 times the wave length of travelling waves, the floating apparatus is subjected to pitching motion such that the maximum angle of inclination of the apparatus in pitching motion is equal to the maximum inclination angle of travelling waves. Furthermore, when the longitudinal length of the apparatus is set approximately 0.4 times the wave length of travelling waves, there is obtained a resonant-like condition, in which the apparatus is subjected to pitching motion over a range of angles beyond the maximum inclination angle of travelling waves. A further reduction of the longitudinal length beyond the length/wave length ratio of 0.4 causes a reduction of pitching motion, as graphically shown in FIG. 8. It is thus clear that the floating apparatus 10' or 20 should be so structured to have a longitudinal length which is in a range between approximately 0.2 and 0.6 times the wave length of effective travelling waves. More preferably, the longitudinal length should be set approximately at 0.4 times the wave length of effective travelling waves.

Let us consider a specific example. It is assumed that the wave period of major travelling waves in an open sea condition is seven seconds. In this case, the wave length of the travelling waves is 70 meters. If the apparatus 10' of FIG. 4 is to be built, then its longitudinal length should be set at 0.4 times 70 meters=28 meters in order to obtain a maximum pitching motion from the consideration given to the results plotted in the graph of FIG. 8. If the apparatus 10' having this optimum longitudinal length is provided as fixed in position, for example, attached to the bottom of the sea by means of poles or the like, the natural frequency of oscillation of the water column inside of the duct 14 may be expressed by the following equation.

$$T = 2\pi \mathrm{SQRT}(L/g)$$

Figure 9:
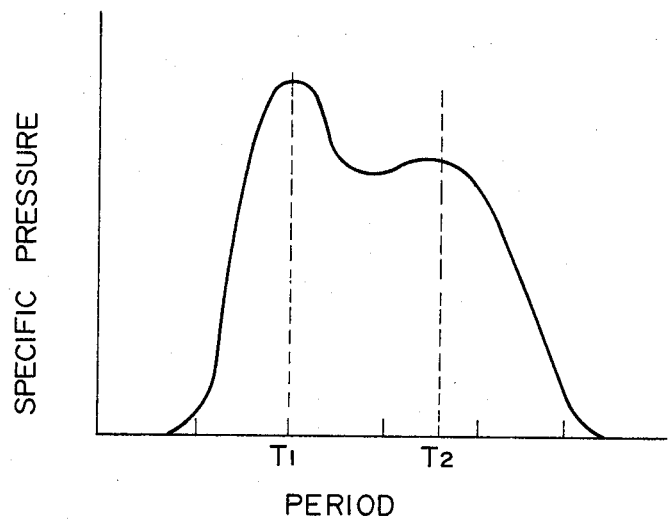

In the case where, L: length of horizontal duct $14a = 28$ meters and g: acceleration of gravity=9.8 meters/sec², we have T=10.6 seconds. Accordingly, if the apparatus 10' is provided to float on the water surface as moored as shown in FIG. 5 in an open sea with travelling waves having the wave length of 70 meters, there are obtained two peaks in its output as shown in FIG. 9, i.e., a first peak output at the first period $T_1 = 7$ seconds resulting from the pitching motion and a second peak output at the second period $T_2 = 10.6$ seconds resulting from the natural frequency oscillation. The results shown in FIG. 9 indicate the fact that those travelling waves having a frequency (or corresponding wave length) in a range between $T_1$ (pitching period) and $T_2$ (natural frequency oscillation period) can be used effectively in conversion of wave energy into electrical energy.

If the apparatus 10' or 20 is provided fixed in position, thereby preventing the apparatus from executing a pitching motion, the peak at the period $T_2$ increases, but the peak at the period $T_1$ decreases, and, thus, as a result, the range of period of travelling waves effectively usable for conversion of wave energy into electrical energy is reduced, which is disadvantageous.

Figure 10:
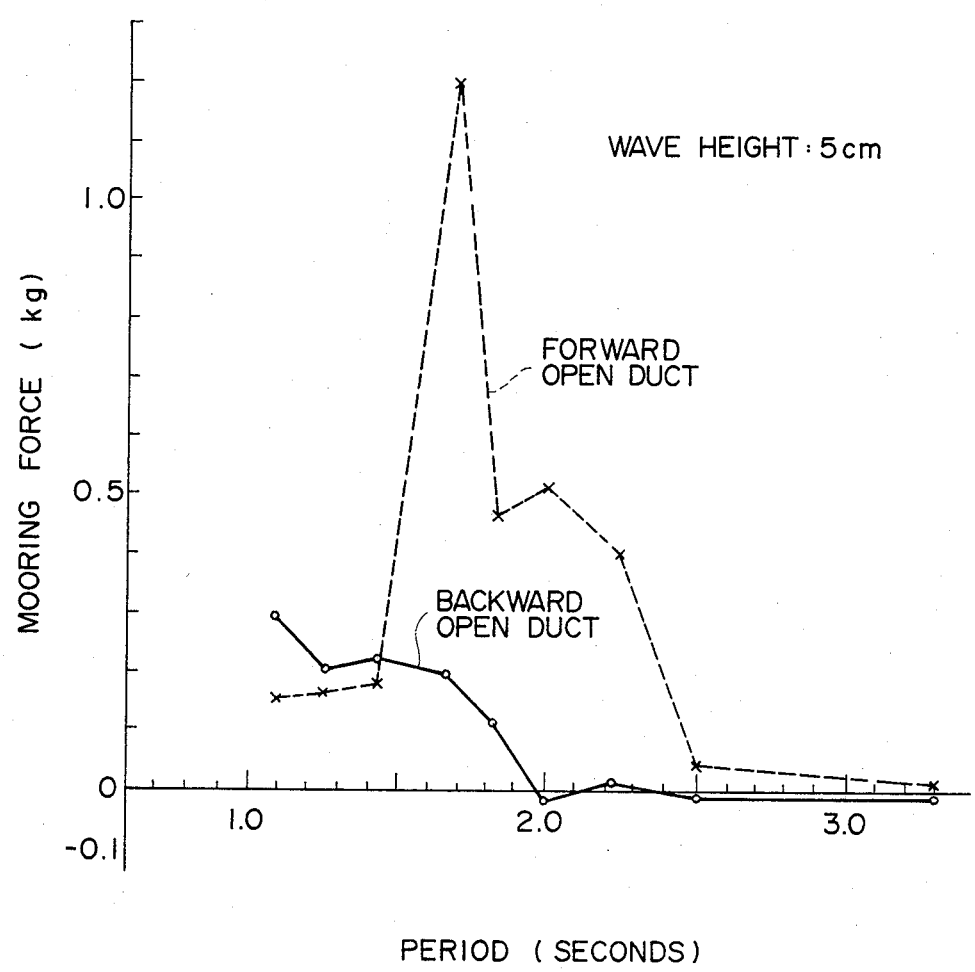

As described previously, the present apparatus allows to obtain a reduced mooring force due to its pitching motion. Since the present apparatus includes a backwardly bent duct having an open rear end, when the water enters into the duct from the open water region, the incoming water comes from all regions around the open end of the duct. However, when the water column inside of the duct is discharged out into the open water region, the outgoing water column takes the form of a water jet. Thus, as a reactive force of this outgoing water jet, the force is applied to the apparatus in the forward direction countering to the pressure drag force experienced by the apparatus. This forward force contributes to mitigate the required level of mooring force because they are directed oppositely. FIG. 10 graphically shows the experimental results obtained for the apparatus 10' of FIG. 4 when it was moored with the open end 14c facing forwardly (dotted line) and backwardly (solid line) with the waves having the height of 5 cm. In the graph of FIG. 10, the abscissa is taken for the wave period in terms of seconds and the ordinate is taken for the required mooring force in terms of Kg. It can be seen that the required mooring force is significantly lower for the case of mooring the front end of the apparatus 10' with the open end 14c directed backwardly as compared with the case of mooring the rear end to orient the open end 14c forwardly, and the mooring force even becomes negative in a certain range of periods, which is attributable to the thrust effect resulting from the outgoing water jet.

Figure 11:
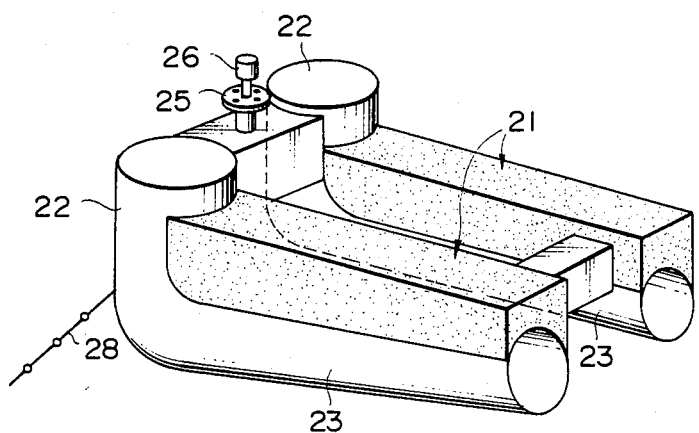
FIG. 11 is a schematic illustration showing in perspective another embodiment of the present invention.

FIG. 11 shows a further embodiment of the present invention, in which two of the apparatus 20 are combined in the form of a catamaran. Such a structure is advantageous in obtaining an increased output and also providing a lateral stability. It is to be noted that three or more of the apparatus 20 shown in FIG. 5 can be combined in a similar manner to obtain a further increased output and lateral stability.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A wave-activated power generating apparatus, comprising:
   a generally L-shaped duct including a vertically extending portion and a horizontally extending portion which is in fluidic communication with the vertically extending portion, said horizontally extending portion having an open rear end;
   a floatable main body fixedly attached to said duct as located rearwardly of said vertically extending portion with respect to the advancing direction of travelling waves moving past the apparatus in operation;
   generating means for generating electric energy, said generating means being mounted to be in operative association with an air flow discharged out of said duct; and
   mooring means for mooring the apparatus such that the apparatus floats on the water surface with said open rear end of said horizontally extending portion directed backwardly with respect to the advancing direction of travelling waves.

2. The apparatus of claim 1 wherein said apparatus has a longitudinal length which is in a range between approximately 0.2 and 0.6 times the wave length of the travelling waves.

3. The apparatus of claim 2 wherein the longitudinal length of said apparatus is approximately 0.4 times the wave length of the travelling waves.

4. The apparatus of claim 3 wherein said longitudinal length of said apparatus corresponds to the longitudinal length of said horizontally extending portion.

5. The apparatus of claim 1 wherein said main body is elongated in shape.

6. The apparatus of claim 5 wherein said main body has a rear end which is substantially flush with the rear end of said horizontally extending portion.

7. The apparatus of claim 1 wherein said duct is rectangular in cross section.

8. The apparatus of claim 1 wherein said duct is circular in cross section.

9. The apparatus of claim 1 wherein said duct further includes a curved connecting section interposed between said vertically and horizontally extending portions.

10. The apparatus of claim 9 wherein said duct is provided with a tab fixedly attached to the curved connecting section and said mooring means is connected to said tab for mooring said apparatus.

11. The apparatus of claim 10 wherein the location of said tab substantially corresponds to a hypothetical fulcrum of pitching motion when said apparatus is subjected to pitching motion by the travelling waves.

12. The apparatus of claim 8 wherein said main body is provided with an inwardly curved front end surface and an inwardly curved bottom surface, and wherein said circular duct is so provided with the vertically extending portion partly received in said inwardly curved front end surface and the horizontally extending portion partly received in said inwardly curved bottom surface.

13. The apparatus of claim 1 further comprising an additional generally L-shaped duct and an additional main body fixedly attached to said duct which are combined with the first mentioned duct and main body in parallel, thereby providing a catamaran-shaped structure.

14. The apparatus of claim 1 wherein said generating means includes an air turbine driven by said air flow and an electric generator operatively coupled to said air turbine.

* * * * *